United States Patent [19]

Inoue et al.

[11] Patent Number: 4,533,617

[45] Date of Patent: Aug. 6, 1985

[54] HEAT FIXING DEVELOPER OF CAPSULE STRUCTURE

[75] Inventors: Sukejiro Inoue, Yokohama; Hiroshi Fukumoto, Kawasaki; Masumi Sasakawa, Kamagaya; Shinji Doi, Kawasaki, all of Japan

[73] Assignee: Canon Kabushiki Kaisha, Tokyo, Japan

[21] Appl. No.: 497,181

[22] Filed: May 23, 1983

[30] Foreign Application Priority Data

| May 26, 1982 | [JP] | Japan | 57-89273 |
| May 26, 1982 | [JP] | Japan | 57-89274 |
| May 26, 1982 | [JP] | Japan | 57-89275 |
| May 26, 1982 | [JP] | Japan | 57-89256 |

[51] Int. Cl.³ .................................................. G03G 9/08
[52] U.S. Cl. ..................................... 430/111; 430/138; 428/407
[58] Field of Search ............... 430/109, 108, 106, 107, 430/111, 138; 428/407

[56] References Cited

U.S. PATENT DOCUMENTS

| 2,297,691 | 10/1942 | Carlson | 430/31 |
| 2,874,063 | 2/1959 | Greig | 430/109 |
| 3,090,755 | 5/1963 | Erchak | 430/109 |
| 3,681,106 | 8/1972 | Burns et al. | 430/109 |
| 3,817,868 | 6/1974 | Van Besauw | 430/110 |
| 3,893,932 | 7/1975 | Azar | 430/111 |
| 3,944,493 | 3/1976 | Jadwin et al. | 430/110 |
| 3,967,962 | 7/1976 | O'Malley | 430/120 |
| 3,974,078 | 8/1976 | Crystal | 430/109 |
| 4,415,645 | 11/1983 | Kouchi et al. | 430/111 |

FOREIGN PATENT DOCUMENTS

| 1210665 | 10/1970 | United Kingdom . |
| 1414159 | 11/1975 | United Kingdom . |
| 1435850 | 5/1976 | United Kingdom . |
| 1495428 | 12/1977 | United Kingdom . |

OTHER PUBLICATIONS

Martens, Technology of Paints, Varnishes and Lacquers, Krieger Pub. Co., Huntington, N.Y., pp. 116–117, (1968).

*Primary Examiner*—John D. Welsh
*Attorney, Agent, or Firm*—Fitzpatrick, Cella, Harper & Scinto

[57] ABSTRACT

A developer for high speed heat fixing excellent in developing characteristic, fixing characteristic, off-set resistance and storage stability is obtained by a heat fixing developer of a capsule structure having the surface of a core particle, containing a binder resin having a glass transition temperature of 60° C. lower and a softening point of 50° to 130° C. and a colorant, coated with a vinyl type polymer having a glass transition temperature of 55° C. or higher, a softening point of 100° to 150° C., a Mw of 150,000 or more and a Mw/Mn of 5 or more.

18 Claims, No Drawings

HEAT FIXING DEVELOPER OF CAPSULE STRUCTURE

BACKGROUND OF THE INVENTION

1. Field of the Invention

This invention relates to a developer to be used for electrophotography, electrostatic printing, etc., particularly to a dry system developer of a capsule structure suitable for heat fixing method.

2. Description of the Prior Art

In the prior art, there have been known a large number of methods as the electrophotographic methods, as disclosed in U.S. Pat. Nos. 2,297,691, 3,666,363, and 4,071,361. Generally speaking, these methods comprise forming electrical latent images by various means on photosensitive members through utilization of photoconductive materials, then developing said latent images by use of toners, and, after optionally transferring the toner images onto transfer materials such as papers, fixing the images by heating or pressurization to obtain copied products.

Also, there have been known various developing methods in which electrical latent images are visualized by use of toners.

For example, there have been known a number of developing methods such as the magnetic brush method as disclosed in U.S. Pat. No. 2,874,063; the cascade developing method as disclosed in U.S. Pat. No. 2,618,552; the powdery cloud method and the fur brush method as disclosed in U.S. Pat. No. 2,221,776; and the liquid developing method; and so on. As the toner to be used in these developing methods, there have been conventionally used fine powders having dyes or pigments dispersed in natural or synthetic resins. Further, it is also known to use fine developing powders having incorporated the third materials for various purposes.

The developed toner-image is transferred onto a transfer material such as paper, if necessary, and fixed.

As the method for fixing toner images, there have been known the method in which toner is heated and meled by a heater or a heat roller to be fused and solidified on a support; the method in which the binder resin of toner is softened or dissolved with an organic solvent to fix the toner on a support; and the method in which the toner is fixed on a support by pressurization.

Toners are prepared from materials which are chosen so as to be suitable for respective fixing methods, and the toner to be used for a specific fixing method cannot generally be used for other fixing methods. In particular, it is almost impossible to use the toner to be used in the heat fusion fixing method by means of a heater widely practiced in the prior art for other methods such as the heat roller fixing method, the solvent fixing method or the pressure fixing method. Accordingly, research and development efforts for toners suitable for respective fixing methods has been performed.

Also, there have been known various magnetic recording methods in which magnetic latent images are formed and developed with magnetic toners.

Concerning the step of fixing toner images onto papers, etc., various methods and devices have been developed. The most general method at present is the so called hot roll fixing system in which heat and pressure are simultaneously applied, and according to this method, an image-receiving sheet carrying toner images is contacted with a heated roller to have the toner images fixed on the image-receiving sheet. However, when such a fixing system is utilized, troubles such as off-set are caused by using a toner of the prior art. Off-set is an unfavorable phenomenon in which a part of the toner carried on the image-receiving sheet is transferred to the roller surface.

As disclosed in U.S. Pat. No. 3,941,898, such an off-set phenomenon is liable to be caused in case of a developer using a low molecular weight resin. For this reason, also as disclosed in said Patent, it may be considered that such an off-set phenomenon may be prevented to some extent by use of a crosslinked resin. However, as a matter of course, by merely utilizing a crosslinked resin, the fixing temperature will be elevated to create a new problem of a low temperature off-set at the unfixed area.

The roller to be contacted with toner images is generally formed at least at its surface layer of a silicone rubber or a fluorine type resin which is good in releasability. There is also a system in which a release oil such as silicone oil is coated on the surface of the roller for prevention of off-set and for prevention of fatigue on the roller surface. However, in the system of coating an oil, there are involved such problems that provision of an oil coating system makes the fixing device complicated and that vaporization of an oil may give unpleasant feelings to users. Therefore, an approach to prevent off-set by oil coating is not preferred and under the present situation it would be very desirable to develop a toner which is broad in fixing temperature region and good in off-set resistance.

Besides the fixing characteristic, toners are also required, as a matter of course, to be excellent in other respects such as blocking resistance, developing characteristic, transfer characteristic, cleaning characteristic, and others. Toners of the prior art have one or more of the defects as mentioned below. That is, most of toners which readily melt by heating are prone to caking or agglomeration during storage or in a copying device. Most of toners are made less desirable in triboelectrification characteristic and free flow by temperature change in the environment. Also, in most toners, the mutual deterioration of toner, carrier particles and the photosensitive plate caused by collisions between toner particles and carrier particles or contact of these particles with the surface of the photosensitive plate as the result of repeated development during continuous usage, results in changed image densities or increases in the background density to lower the quality of the copied products. Thus, it would be desirable to have a toner which is excellent in various toner characteristics and suitable for the hot roller fixing method.

Further, quite recently, there has been a need for high speed fixing for the purpose of making copying operations more efficient. In the heat fixing systems of the prior art, for the purpose of enhancing the fixing speed, attempts were made to lower the softening point of the binder resin of the toner to thereby effect heat fixing more easily. However, lowering of the softening point of a resin may result in a problem such that toner particles may cause agglomeration or blocking during usage.

As described above, it has been strongly desired to have a toner which is suitable for high speed hot roller fixing, and yet excellent in toner characteristics without roller off-set and agglomeration or blocking.

In the prior art, for the purpose of merely increasing the heat fixing speed or reducing the heat source energy at a constant level of speed, it has been considered to make the toner of a capsule type, and there have been proposals about a heat fixing toner of microcapsule type aiming at a high speed heat fixing or low heat energy consumption. A capsule toner of this type has a composition of a core material of a low melting point which is more easily melted by heating and a shell material of a higher melting point which has characteristics necessary for toners such as charging characteristic, free flow, etc. For example, Japanese Patent Publication No. 1588/1974 discloses an example of a polystyrene capsule containing wax as core material or a polystyrene capsule containing an aqueous solution as core material. However, all these capsules, due to a lack of consideration about the recent developments in hot roll high speed fixing, sufer so markedly from off-set to be impractical. Thus, the heat fixing capsule toner of the prior art cannot overcome the problem of roller off-set.

SUMMARY OF THE INVENTION

An object of the present invention is to provide a heat fixing toner capable of overcoming the problems as described above. Further, it is also another object of the present invention to provide a toner for hot roller fixing which is good in the fixing characteristic and also good in off-set resistance.

Still another object of the present invention is to provide a toner for hot roller fixing which is good in charging characteristics and yet exhibits constantly stable charging characteristics during usage to give clear images without fog.

Still another object of the present invention is to provide a toner for hot roller fixing which is excellent in free flow, free from agglomeration and also excellent in impact resistance.

Still another object of the present invention is to provide a toner for hot roller fixing which has little adherency on toner holding members or the surface of photosensitive member.

Still another object of the present invention is to provide a magnetic toner which, when made into a magnetic developer, exhibits good and uniform magnetic properties and is capable of hot roller fixing.

The above objects of the present invention can be accomplished by a toner of a capsule structure comprising a material having high speed heat fixing characteristic and off-set preventive characteristic as the core material.

The specific feature of the present invention resides in a heat fixing developer of a capsule structure having the surface of a core particle, containing a binder resin having a glass transition temperature of 60° C. or lower and a softening point of 50° to 130° C. and a colorant, coated with a vinyl type polymer having a glass transition temperature of 55° C. or higher, a softening point of 100° to 150° C., a weight-average molecular weight (Mw) of 150,000 or more and a Mw/Mn of 5 or more.

The binder resin mentioned here contains an amorphous polyester resin or a vinyl type polymer having a crosslinked structure with a gel content of 20% or more as the main component.

In short, the present invention is a readily heat fixing toner of a capsule structure which accomplished high speed heat fixing and off-set resistance with the use of a specific core material, simultaneously with accomplishment of toner characteristics in general such as agglomerating characteristic, blocking characteristic, developing characteristic, etc. with the use of a shell material.

According to the first embodiment of the present invention, the aforesaid binder resin comprises an amorphous polyester resin having a glass transition temperature of 60° C. or lower and a softening point of 60° to 130° C.

According to the second embodiment of the present invention, the aforesaid binder resin comprises an amorphous polyester having a glass transition temperature of 60° C. or lower, a softening point of 50° to 110° C. and an acid value of 10 to 150 and an aliphatic amine or its derivative in a weight ratio of 1/500 to 1/5 relative to said polyester.

According to the third embodiment of the present invention, the aforesaid binder resin comprises an amorphous polyester having a glass transition temperature of 60° C. or lower, a softening point of 50° to 110° C. and an acid value of 10 to 150 and a polyvalent metal compound in a weight ratio of 1/50 to ¼ relative to said polyester.

According to the fourth embodiment of the present invention, the aforesaid binder resin comprises a vinyl type polymer having a glass transition temperature of 55° C. or lower, a softening point of 80° to 130° C. and a crosslinked structure with a gel content of 20% or more as the main compound.

DESCRIPTION OF PREFERRED EMBODIMENT

We have investigated about materials which are good in hot roll high speed fixing characteristic and excellent in off-set resistance, and found that a binder resin having a glass temperature of 60° C. or less and a softening point of 50° to 130° C. is preferable with respect to off-set resistance. However, even such a resin, when it is made into a toner according to the simple crushing method or the spray drying granulation method of the prior art, it is difficult to satisfy both of contradictory requirements of high speed fixing and toner blocking resistance or caking resistance, whereby there is no way but to seek for some compromise between these requirements. As the result of extensive studies made about this point, it has now been found that various characteristics of hot roll high speed fixing (low temperature fixing characteristic), off-set resistance, blocking resistance, caking resistance, developing characteristic, etc. can be satisfied by making a hot fixing toner of a capsule structure containing the above binder resin as the core material. The present invention is accomplished on the basis of such a finding.

More specifically, the first preferred embodiment of the above binder resin is an amorphous polyester resin having crosslinkages.

The second preferred embodiment is a combination of an amorphous polyester resin with an aliphatic amine or a derivative thereof. The aliphatic amine mixed with the polyester undergoes some reaction with the polyester in the course of treatment such as kneading, etc. to alter greatly the thermal characteristics of the polyester. Such alterations exhibit appearance as if they were crosslinking reactions of the polyester, whereby the polyester is more improved in off-set resistance without impairing its fixing characteristic.

The third preferred embodiment is a combination of an amorphous polyester resin and a polyvalent metal compound. The polyvalent metal compound gives rise to some heat reactions which may be considered to be due to the free metals thereof by the heat treatment such as kneading, etc., whereby the polyester may be estimated to be converted to a crosslinked structure. Also in this case, the polyester is more improved in off-set resistance without impairing its fixing characteristic.

The fourth embodiment is a vinyl type polymer having a crosslinked structure with a gel content of 20% or more.

In the heat fixing toner of a capsule structure according to the present invention, there is employed as the core material a material with low Tg and good off-set resistance which cannot be used alone in the prior art due to its properties such as blocking characteristic, agglomerating characteristic, etc. and said core material undertakes most of the function of hot roller fixing characteristic, while there is employed as the shell material a material having toner characteristics of a dry system toner such as developing characteristic, storage characteristic, etc. which are similar or superior to those of the prior art, thus making so called function separation type, whereby various objects of the present invention could be accomplished.

As the acid component for the polyester to be used in the core particles of this invention, there are aromatic polycarboxylic acids such as terephthalic acid, isophthalic acid, phthalic acid, naphthalene dicarboxylic acid, trimellitic acid, pyromellitic acid, and the like; aromatic oxycarboxylic acids such as p-(2-hydroxyethoxy)benzoic acid and the like; aliphatic polycarboxylic acids such as maleic acid, maleic anhydride, fumaric acid, succinic acid, adipic acid, azelaic acid, sebacic acid, and the like; alicyclic polycarboxylic acids such as 1,3-cyclohexane dicarboxylic acid, hexahydrophthalic acid, tetrahydrophthalic acid, and the like.

As the alcoholic component, there are aliphatic polyols such as ethylene glycol, propylene glycol, 1,4-butane diol, 1,3-butane diol, 1,5-pentane diol, 1,6-hexane diol, neopentyl glycol, glycerin, trimethylol propane, pentaerythritol, sorbitol, and the like; alicyclic polyols such as 1,4-cyclohexane diol, 1,4-cyclohexane dimethanol, and the like; and etherated diphenols such as ethylene oxide adducts of bisphenol A, propylene oxide adducts of bisphenol A, and the like.

For the polyester to be used in the present invention, there may be chosen freely both of the acidic component and the alcoholic component, so long as the combination satisfies the conditions of its amorphous characteristic and the glass transition temperature. Generally speaking, in order to have both amorphous characteristic and a certain lower softening point, it is necessary to contain an asymmetric component. Also, for the purpose of off-set resistance, it is preferred to incorporate a polycarboxylic acid or a polyol of trivalent or more so as to impart an appropriate degree of crosslinked structure.

As the binder resin for the core particles to be used in the first embodiment of the present invention, there may preferably be used a specific class of polyester resins suitable for the object of the present invention. That is, it is desired to contain 50% by weight or more, more preferably 60% by weight or more, of an amorphous polyester resin having a glass transition temperature of 60° C. or lower and a softening point of 60° to 130° C. as the binder for the core particles.

The polyester in the first embodiment has a glass transition temperature of 60° C. or lower and a softening point of 60° to 130° C. With a glass transition temperature exceeding 60° C. or a softening point exceeding 130° C., an excessive amount of heat energy is required during heat fixing to provide the high speed heat fixing characteristic. And, with a softening point less than 60° C., off-set resistance during fixing is reduced. The polyester is also desired to have a number-average molecular weight of 2000 to 20000, preferably 3000 to 10000. With a molecular weight less than 2000, releasability to the heat fixing roll is reduced to cause easily off-set phenomenon, while, on the contrary, with a molecular weight exceeding 20000, heat fixing power is lowered as the softening point is increased.

In case of the polyester to be combined with an aliphatic amine or its derivative according to the second embodiment of the present invention, it is desired to contain 50% by weight or more, more preferably 60% by weight or more, of an amorphous polyester resin having a glass transition temperature of 60° C. or lower and a softening point of 50° to 110° C. as the binder for the core particles.

The polyester in the second embodiment has a glass transition temperature of 60° C. or lower and a softening point of 50° to 110° C. With a glass transition temperature exceeding 60° C. or a softening point exceeding 110° C., through further enhancement of the softening point by the thermal reaction with the aliphatic amines of the present invention, an excessively great heat energy is required during heat fixing to provide the high speed heat fixing characteristic. And, with a softening point less than 50° C., off-set resistance during fixing is reduced. Similarly, with a number-average molecular weight (Mn) less than 2000, the heat roller releasability is reduced to readily caused the off-set phenomenon, while, on the contrary, with a number-average molecular weight exceeding 20000, heat fixing power is lowered as the softening point is increased.

The aliphatic amines or derivatives thereof to be used in combination with aforesaid polyester are those which can react with the terminal residues in the polyester, including, for example, aliphatic amines such as dibutylamine, tripropylamine, tributylamine, diamylamine, octadecyl dimethylamine, hexadecyl dimethylamine, tallowalkyl propylenediamine, hardened tallowalkyl dimethylamine, hardened tallowalkyl propylenediamine, and the like, or aliphatic amine derivatives such as polyoxyethylene dodecylamine, polyoxyethylene octadecylamine, polyoxyethylene tallowalkylamine, polyoxyethylene tallowalkyl propylenediamine, and the like. It is preferred to use an aliphatic amine or its derivative having a high melting point and a boiling point high enough so it is not volatilized during preparation or use of the toner.

In the present invention, the polyester and the aliphatic amines may be mixed at a proportion of 99.8 to 80% by weightfor the polyester and 0.2 to 20% by weight for the aliphatic amines. That is, the ratio of amines to the polyester is 1/500 to 1/5 weight ratio, more preferably 1/500 to 1/10. In case of an amine ratio less than 1/500, no sufficient heat reaction occurs to reduced the releasability of the toner relative to the heat roll to facilitate off-set phenomenon. On the other hand, at an amine ratio exceeding 1/5, deleterious influences are incurred on the heat free flow of the toner which gives rise to inconveniences in fixing such as increase of fixing temperature.

The third embodiment of the present invention comprises a mixture of 98 to 80% by weight of an amorphous polyester resin having a glass transition temperature of 60° C. or lower, a softening point of 50° to 110° C., a number-average molecular weight preferably of 2000 to 20000 and an acid value of 10° to 150 and 2 to 80% by weight of a polyvalent metal compound, and these are desired to be crosslinked to an appropriate degree through the heat reaction. The crosslinked mixture may desirably be employed in an amount of 50% by weight or more, more preferably 60% by weight or more, as the binder for the core particles.

The polyester in the third embodiment has a glass transition temperature of 60° C. or lower and a softening point of 50° to 110° C. If a glass transition temperature exceeds 60° C. or a softening point exceeds 130° C., when further enhancement of the softening point by the thermal reaction with the polyvalent metal compound of the present invention is taken into consideration, an excessively great heat energy is required during heat fixing to provide the high speed heat fixing characteristic. And, with a softening point less than 50° C.( off-set resistance during fixing may be reduced depending on the degree of the reaction with the polyvalent metal salt. Similarly, with a number-average molecular weight less than 2000, the heat roller releasability is reduced to readily cause the off-set phenomenon, while, on the contrary, with a molecular weight exceeding 20000, heat fixing characteristic is reduced as the softening point is increased.

The polyvalent metal compound to be used in combination with the aforesaid polyester is one capable of reacting with the carboxyl groups in the polyester, as exemplified by oxides such as zinc oxide, magnesium oxide, aluminum oxide, and others; salts such as magnesium acetate, calcium acetate, basic aluminum acetate, calcium stearate, zinc stearate, and others; alkoxides such as aluminum isopropoxide, aluminum -n-butoxide, aluminum methoxide, and others; hydroxides such as aluminum hydroxide, ferric hydroxide, and others; chelate compounds such as aluminum acetylacetonate, iron acetylacetonate, and others.

In the present invention, the polyester and the polyvalent metal compound may be mixed at a proportion of 98 to 80% by weight of polyester and 2 to 20% by weight of polyvalent metal compound, namely 1/50 to 1/4 in terms of the weight ratio of polyvalent metal compound to polyester. At a level of polyvalent metal compound less than 1/50, insufficient heat reaction occurs to lessen the releasability of the toner relative to the heat roll to promote the off-set phenomenon.

On the contrary, at a level of the metal compound exceeding ¼, deleterious influences are incurred on the heat free flow of the toner to give rise to inconveniences in fixing such as increase of the fixing temperature.

According to the fourth embodiment of the present invention, the binder resin in core particles contains preferably 50% or more, more preferably 60 % or more, of a crosslinked vinyl type polymer having a glass transition point of 55° C. or lower, a softening point of 80° to 130° C. and a gel content of 20% or more. The vinyl type polymer contains as its constituent units primarily monomers of aromatic vinyl compounds, α-methylene aliphatic monocarboxylic acid esters, and these are appropriately crosslinked with a crosslinking agent to provide main resin components.

As constituent monomers, there may be included styrenes such as styrene, o-methylstyrene, p-methylstyrene, 2,4-dimethylstyrene, p-n-butylstyrene, p-tert-butylstyrene, p-n-dodecylstyrene, p-chlorostyrene, p-phenylstyrene, and the like; vinyl naphthalenes; ethylenically unsaturated monoolefins such as ethylene, propylene, isobutylene, and the like; vinyl chloride; vinyl esters such as vinyl acetate, vinyl butyrate, vinyl benzoate, and the like; α-methylene aliphatic monocarboxylic acid esters such as methyl acrylate, ethyl acrylate, n-butyl acrylate, isobutyl acrylate, propyl acrylate, n-octyl acrylate, dodecyl acrylate, lauryl acrylate, 2-ethylhexyl acrylate, stearyl acrylate, 2-chloroethyl acrylate, phenyl acrylate, methyl α-chloroacrylate, methyl methacrylate, ethyl methacrylate, propyl methacrylate, n-butyl methacrylate, isobutyl methacrylate, n-octyl methacrylate, dodecyl methacrylate, lauryl methacrylate, 2-ethylhexyl methacrylate, stearyl methacrylate, phenyl methacrylate, dimethylaminoethyl methacrylate, diethylaminoethyl methacrylate, and the like; acrylic acid or methacrylic acid derivatives such as acrylonitrile, methacrylonitrile, acrylamide, and the like; vinyl ethers such as vinyl methyl ether, vinyl ethyl ether, vinyl isobutyl ether, and the like; vinyl ketones such as vinyl methyl ketone, vinyl hexyl ketone, methyl isopropenyl ketone, and the like; N-vinyl compounds such as N-vinyl pyrrole, N-vinyl carbazole, N-vinyl indole, N-vinylpyrrolidene, and the like.

As the crosslinking agent, there may be employed, for example, divinyl compounds such as divinylbenzene, 1,5-hexadien-3-e, hexatriene, divinylether, divinyl sulfone, and the like; diallyl compounds such as allyl phthalate, 2,6-diarylphenol, diallyl carbinol, and the like. As a measure for expressing the degree of crosslinking, there is the gel content (percentage of gelation) and the main component resin of the binder resin of the present invention is required to have a gel content of 20% or more, more preferably 30% or more.

The gel content refers to the proportion of the polymer moiety rendered insoluble in a solvent as the result of crosslinking, and it can be used as one kind of index expressing the crosslinking degree of a highly crosslinked polymer. The gel content is defined as the value measured in the following manner. That is, a certain weight (W1 g) of a polymer is weighed, and the soluble component in the polymer is removed by a Soxhlet's extractor using a G-3 glass filter of, and further the sample remaining after extraction is dried and weighed (W2 g). The gel content is calculated as $W2/W1 \times 100$ (%). A non-polar solvent such as benzene, toluene, etc. may preferably be used for such solvent.

As the binder resin for core particles, it is also possible to use other binder resins known in the art within the range which does not impair the performance of the present invention, as a mixture with the resin of the present invention. Such resins may include polyester resins outside the scope of the present invention, epoxy resins, styrene-acrylic resins, butyral resins, ethylene-ethyl acrylate resins, styrene-butadiene resins, and others.

As the thermoplastic resins to be used for wall materials in the present invention, it is basically possible to utilize those conventionally used as binders for toner, but they are somewhat restricted on account of the restriction in capsule preparation according to the present invention. Within said range, there may be included, for example, those utilizable as aqueous suspensions, or those utilizable as alkali soluble type aqueous solutions, those which are capable of forming coating layers on core particles according to known microencapsulation methods or those which can be formed through the reaction at the time of encapsulation, etc.

The resins of the aqueous suspension type are required to have various characteristics such as a minimum film forming temperature of the suspension which is around softening point of the core particles or preferably lower by 30° C. or more than said point, good wettability as well as adhesion to core particles, uniform coating without brittleness and tackiness as necessitated by maintenance of durability of the toner on formation of outer walls, appropriate electric resistance (insulation), triboelectrification characteristic as necessitated by maintenance of image forming ability. As such resin components, there may be included those comprising a copolymeric resin prepared by emulsion polymerization of two or more kinds of monomers selected as desired from acrylic acid esters, methacrylic acid esters, styrene or derivatives thereof, vinyl acetate, maleic acid esters with about 0.2 to 10 mole % of an organic acid monomer such as acrylic acid, methacrylic acid, maleic acid, itaconic acid, crotonic acid, etc. as the main component, namely containing 60 mole % or more of said copolymeric component in the resin component.

As the resin component of the type utilizable as an alkali soluble type aqueous solution, there are copolymers of two or more kinds of monomers selected as desired from monomers such as styrene or derivatives thereof, acrylic acid esters, methacrylic acid esters, maleic acid esters, and the like with an organic acid monomer such as acrylic acid, maleic acid, itaconic acid, crotonic acid, and the like in an amount to give an acid value after polymerization of about 40 to 200.

These thermoplastic resins employed have glass temperatures of 55° C. or higher, softening points of 100° to 150° C. With a glass transition temperature lower than 55° C., the resulting toner will undergo blocking during storage to become practically useless. On the other hand, with a softening point of less than 100° C., off-set will liable to occur during heat fixing. Further, a softening point in excess of 150° C. will impair markedly the heat fixing characteristic of core materials.

The thermoplastic resin in required to have a weight-average molecular weight, Mw, of 150,000 or more for prevention of the heat roller off-set, and Mw/Mn of 5 or less from the same point of view. At a Mw less than 150,000 or a Mw/Mn less than 5, the thermally fused vinyl type polymer will be poor in off-set resistance.

The capsule toner of the present invention may have also charge controllers, colorants, free flow modifiers added in either one or both of the core material and the shell, if desired, and the charge controller or the free flow modifier may also be mixed with the toner (external addition). As such charge controllers, there are metal containing dyes, nigrosine, etc.; as colorants, there may be employed dyes or pigments well known in the art; and as free flow modifiers, there are colloidal solica, metal salts of fatty acids, etc.

When it is desired to obtain a magnetic toner, minute magnetic particles may be added into the toner. As a magnetic material, there may be employed magnetizable materials, as exemplified by those well known in the art as magnetic materials, including minute metallic powders such as of iron, manganese, nickel, cobalt, chromium, etc., various ferrites, alloys or compounds of manganese, etc. and other strongly magnetic alloys. These magnetic fine particles may be added to either the core material or the shell material, but it is preferred to be added to the core material when obtaining an insulating toner.

Further, for making the releasability relative to the heat fixing roll more complete, it is also possible to add a releasing material such as low molecular weight polyethylenes, low molecular weight polypropylenes, and other polyolefins, and other releasing materials similar to these, such as metal salts of fatty acids, higher fatty acid ester, fatty acid amides, silicone varnish, etc. to the core material and/or the shell material.

In the present invention, as the method for obtaining the core particles, there may be applied directly the dry system toner preparation method well known in the art. For example, the most general method comprises mixing previously a polyester resin with other compounded materials in fine particles, then homogeneously mixing by heat melting and kneading, followed by air jet pulverization and classification by air wind classifying machine to obtain core particles with definite particle sizes. It is also possible to obtain core particles with definite particle sizes by preparing an organic solvent solution of a polyester resin and homogeneously dispersing the compounded materials therein, followed by granulation by atomizing drying by means of a spray drier.

In the present invention, as the encapsulation method, spray drying is preferred, but it is also possible to utilize the phase separation method, the suspending-in-air coating method and others.

The present invention is described in more detail by referring to the following Examples, by which the present invention is not limited. The parts in Examples are all parts by weight. Measurements of various physical properties were conducted according to the following methods.

Glass transition temperature:
  measured at a temperature elevation speed of 16° C./min. by means of a differential scanning calorimeter (Model DSC-1B, produced by Perkin Elmer Co.)

Softening point:
  according to JIS K 2531, the softening point test by the ring-ball method Number-average, weight-average molecular weights:
  according to GPC measurement, with standard polystyrene samples as references.

PREPARATION EXAMPLE 1

Into a four-necked flask were charged 560 parts of a polypropyleneoxide adduct of bisphenol A, followed by setting of a stirrer, a condenser, a thermometer, and a gas introducing tube on the flask, and then the flask was placed in a mantle heater. After the reaction vessel was replaced with nitrogen gas, the contents were heated to 50° to 60° C., whereupon 190 parts of fumaric acid and 0.4 part of hydroquinone were added and the mixture was heated under stirring to 210° C. After elapse of about 5 hours while removing continuously the water formed by the reaction, the reaction was monitored by measurement of the acid value every one hour so as to find the end point of the reaction. On reaching an acid value of about 50, 0.3 part of sorbitol was added to the reaction mixture, followed further by the reaction until the acid value becomes about 25, and then the resin was cooled to room temperature. The resin thus obtained had Tg of 55° C. and softening point of 95° C.

PREPARATION EXAMPLE 2

According to the same procedure as used in Preparation example 1, 650 parts of a polyethyleneoxide adduct of bisphenol A and 7 parts of glycerine were charged into a flask, followed by heating at 50° C. and replacement with nitrogen. To this mixture were added 240 parts of fumaric acid and 0.4 part of hydroquinone, and these mixtures were allowed to react by heating under stirring to 210° C. After completion of the reaction, the resin was cooled to room temperature. This resin had Tg of 52° C. and softening point of 120° C.

PREPARATION EXAMPLE 3

Into a flask were charged 200 parts of fumaric acid, 600 parts of polyethyleneoxide adduct of bisphenol A and 0.5 part of diphenolic acid, and the reaction mixture was heated under stirring to about 80° C. Then, about 0.4 part of hydroquinone was added, and the mixture was gradually heated over about 6 hours up to about 200° C. After evaporation of the alcohol recovered and the residual starting materials, and after about 8 hours under reduced pressure the reaction was permitted to proceed. After completion of the reaction, the mixture was left to cool. The resulting resin had Tg of 59° C. and softening point of 100° C.

PREPARATION EXAMPLE 4

Into a flask were charged 580 parts of dimethyl isophthalate, 300 parts of 1,4-butylene diol, and 12 parts of trimethylol propane, and the reaction mixture was heated under stirring to about 80° C. Then, about 1 g of tetrabutyltitanate was added, and the mixture was gradually heated over about 6 hours up to about 210° C. to carry out the reaction. After completion of the reaction, the mixture was left to cool. The resulting resin had Tg of 57° C. and softening point of 70° C.

PREPARATION EXAMPLE 5

Into a flask were charged 500 parts of terephthalic acid, 100 parts of ethylene glycol, 420 parts of neopentyl glycol, 50 parts of trimethylol propane, and 270 parts of isophthalic acid, and the mixture was heated under stirring to 50° C. Then, 0.6 part of dibutyltin oxide was added, and the mixture was heated to 220° C., and the reaction was carried out for about 6 hours. The polyester obtained had Tg of 50° C. softening point of 86° C., and acid value of 96.

PREPARATION EXAMPLE 6

Into a flask were charged 650 parts of terephtalic acid, 200 parts of sebacic acid, 140 parts of isophthalic acid, 650 parts of ethylene glycol, and 350 parts of neopentyl glycol, and the reaction was carried out at 180° to 220° C. for 4 hours. Then, the system was brought to reduced pressure, under which the reaction was carried out at 230° C. for additional one hour. The resulting resin had Tg of 30° C., softening point of 100° C., and acid value of 73.

PREPARATION EXAMPLE 7

Following the same procedure as used in Preparation example 1, 400 parts of terephthalic acid, 100 parts of isophthalic acid, 280 parts of ethylene glycol, and 120 parts of neopentyl glycol were charged into a flask, followed by heating under stirring to 60° C. Then, the mixture was heated to about 220° C., whereat the reaction was carried out for about 6 hours. After completion of the reaction, the mixture was left to cool. The resulting polyester had Tg of 65° C. and softening point of 135° C.

PREPARATION EXAMPLE 8

Into a flask were charged 580 parts of dimethyl terephtalate, 300 parts of 1,2-propane diol, and 4 parts of trimethylol propane. The mixture was heated to about 80° C., and after addition of 1.5 part of tetrabutyltitanate, the mixture was gradually heated over about 6 hours up to about 200° C. The system was brought to reduced pressure, and after removal of the distillate, the mixture was further heated under reduced pressure for 6 hours to complete the reaction. The resulting polyester had Tg of about 80° C. and softening point of about 95° C.

PREPARATION EXAMPLE 9

Into a four-necked flask were charged 700 parts of polyethyleneoxide adduct of bisphenol A and 7 parts of glycerine, followed by setting of a stirrer, a condenser, a themometer, and a gas introducing tube on the flask, and then the flask was placed in a mantle heater. After the reaction vessel was replaced with nitrogen gas, the contents were heated to 50° to 60° C., whereupon 270 parts of fumaric acid and 0.4 part of hydroquinone were added and the mixture was heated under stirring to 210° C. After elapse of about 5 hours while removing continuously the water formed by the reaction, the reaction was monitored by measurement of the acid value every one hour so as to find the end point of the reaction. After the reaction was continued until the acid value becomes about 25, the resin was cooled to room temperature. The resin thus obtained had Tg of 52° C., softening point of 110° C., and acid value of 45.

PREPARATION EXAMPLE 10

Into a flask were charged 490 parts of terephthalic acid, 180 parts of trimellitic acid, 40 parts of propylene glycol, 220 parts of neopentyl glycol, and 25 parts of trimethylol propane, and esterification reaction was carried out at 210° to 230° C. for 5 hours. Then, with addition of 266 parts of isophthalic acid, the reaction was carried out in a nitrogen stream at 230° C. for 6 hours. The polyester obtained had Tg of 46° C., softening point of 57° C., and acid value of 140.

EXAMPLE 1

A mixture comprising 100 parts of a polyester (Preparation example 1), 70 parts of magnetic powders (Magnetite EPT-1000, produced by Toda Kogyo), and 5 parts of a low molecular weight polypropylene (Biscol 660 P, produced by Sanyo Kasei Kogyo) was heated and kneaded on a roll. After the kneaded product was left to cool, it was coarsely pulverized into sizes of 1 to 2 mm, followed further by micropulverization by means of a jet mill and classification by means of a wind force classifying machine, to obtain core material particles with an average size of around 12μ.

Separately, there was also prepared a styrene-butyl methacrylate-butyl acrylate-acrylic acid copolymer emulsion (acrylic acid 3 mol %, solid content 40%). The resin constituting this emulsion had a glass transition temperature of 70° C., a softening point of 140° C., Mw of 230,000, and Mw/Mn of 6.3.

To 20 parts of this emulsion were added 58 parts of the above core material, 0.4 part of a metal complex dye (Bontron E-81, produced by Orient Kagaku), and 240 parts of water, and the mixture was thoroughly mixed and dispersed while avoiding foaming. Then, the resulting dispersion was spray dried by means of a spray drier under the conditions of an inlet temperature of 160° C. and an outlet temperature of 90° C. to provide a crosslinked resin coating layer mainly constituted of the aforesaid emulsion copolymer around the core material particles. To the thus obtained capsule toner was added a colloidal silica (Aerosil R-972), and the mixture was supplied to a one-component developing system electrophotographic copying device (NP-400 RE, produced by Canon) for copying test, whereby sufficient image density and developing durability could be obtained. For the purpose of detailed study about the heat fixing characteristic, only the fixing portion of said copying device was prepared, and unfixed image on a transfer paper separately prepared was fixed on this separate fixer. As the result, fixing characteristic was excellent without generation of the off-set phenomenon over a wide temperature range. Further, when the capsule toner was left to stand in an atmosphere at 50° C., there was observed no blocking or caking.

EXAMPLES 2 TO 6

Example 1 was repeated except that the polyester of Example 1 was replaced with other examples (Preparation examples 2 to 6) to obtain respective toners (Examples 2 to 6). Their properties are shown in Table 1.

EXAMPLE 7

A mixture comprising 100 parts of a polyester (Preparation example 1), 70 parts of magnetic powders (Magnetite EPT-1000, produced by Toda Kogyo), and 5 parts of a low molecular weight polypropylene (Biscol 660 P, produced by Sanyo Kasei Kogyo) was heated and kneaded on a roll. After the kneaded produce was left to cool, it was coarsely pulverized into sizes of 1 to 2 mm, followed further by micropulverization by means of a jet mill and classification by means of a wind force classifying machine, to obtain core material particles with an average size of around 12μ.

Separately, there was also prepared a styrene-butyl methacrylate-ethyl acrylate-2-ethylhexyl acrylate-itaconic acid copolymer emulsion (itaconic acid 2 mol %, solid content 42%) The resin constituting this emulsion has a glass transition temperature of 65° C., a softening point of 135° C., Mw of 280,000 and Mw/Mn of 8.5.

An acrylic copolymer resin (Highloss X-316, produced by Seiko Kagaku, acid value 60) was dissolved in an ammoniacal alkali solution to provide a 25% aqueous solution.

Twenty (20) parts of the above emulsion were mixed with 8 parts of the above aqueous resin solution, and to the resulting mixture were added 50 parts of above core material and 200 parts of water, followed by thorough mixing and dispersing. Then, the resulting dispersion was spray dried by means of a spray drier under the conditions of an inlet temperature of 160° C. and an outlet temperature of 80° C. to provide a crosslinked resin coating layer constituted mainly of the aforesaid emulsion copolymer and the alkali soluble type resin around the core material particles.

To the thus obtained capsule toner was added a colloidal silica (Aerosil R-972), and copying test was conducted similarly as in Example 1. The results are shown in Table 1.

EXAMPLE 8

A capsule toner was obtained in the same manner as used in Example 7 utilizing an emulsion/alkali aqueous solution mixture except for replacing the polyester of Example 7 with the polyester of Preparation example 6, to obtain the results shown in Table 1.

COMPARATIVE EXAMPLE 1

Example 7 was repeated except that the polyester of Example 7 was replaced with the polyester of Preparation example 7 to obtain a capsule toner.

COMPARATIVE EXAMPLE 2

Example 1 was repeated except that the polyester of Example 1 was replaced with the polyester of Preparation example 8 to obtain a capsule toner.

COMPARATIVE EXAMPLE 3

A mixture comprising 100 parts of the polyester of Preparation example 6, 80 parts of magnetic powders (Magnetite BL-120, produced by Titan Kogyo), and 5 parts of a low molecular weight polyethylene (Hiwax 220 P, produced by Mitsui Sekiyu Kagaku) was heated and kneaded on a roll. The kneaded product was left to cool, and coarsely pulverized, followed further by micro-pulverization by means of a jet mill and classification by means of a wind force classifying machine, to obtain core material particles with sizes of 5 to 25μ. When this toner was provided for the same copying fixing test according to the same method as in Example 1, there were obtained sufficient image and fixing characteristic. However, when this toner was left to stand in an atmosphere at 45° C. for 24 hours, blocking occurred completely to form a massive product.

TABLE 1

| | | Image quality | Fixing temperature | Off-set | Blocking after standing at 45° C. |
|---|---|---|---|---|---|
| Example | 1 | Good | 115° C. | Good | None |
| | 2 | " | 135 | " | " |
| | 3 | " | 120 | " | " |
| | 4 | " | 110 | " | " |
| | 5 | " | 120 | " | " |
| | 6 | " | 125 | " | " |
| | 7 | " | 120 | " | " |
| | 8 | " | 125 | " | " |
| Comparative example | 1 | Good | 145 | slightly unfixed off-set | None |
| | 2 | " | 140 | slightly unfixed off-set | " |
| | 3 | " | 110 | slightly high temperature off-set | Bad |

EXAMPLE 9

A mixture comprising 100 parts of a polyester (Preparation example 9), 2 parts of hardened tallow alkylpropylenediamine, 70 parts of magnetic powders (Magnetite EPT-1000, produced by Toda Kogyo), and 5 parts of a low molecular weight polypropylene (Biscol 660 P, produced by Sanyo Kasei Kogyo) was heated and kneaded on a roll. After the kneaded product was left to cool, it was coarsely pulverized into sizes of 1 to 2 mm, followed further by micropulverization by means of a jet mill and classification by means of a wind force classifying machine, to obtain core material particles with an average size of around 12μ.

Separately, there was also prepared a styrene-butyl methacrylate-butyl acrylate-acrylic acid copolymer emulsion (acrylic acid 3 mol %, solid content 40%). The resin constituting this emulsion had a glass transition temperature of 70° C., a softening point of 140° C., Mw of 230,000 and Mw/Mn of 6.3.

To 20 parts of this emulsion were added 58 parts of the above core material, 0.4 part of a metal complex dye (Bontron E-81, produced by Orient Kagaku), and 240 parts of water, and the mixture was thoroughly mixed and dispersed while avoiding foaming. Then, the resulting dispersion was spray dried by means of a spray drier under the conditions of an inlet temperature of 160° C. and an outlet temperature of 90° C. to provide a crosslinked resin coating layer mainly constituted of the aforesaid emulsion copolymer around the core material particles. To the thus obtained capsule toner was added a colloidal silica (Aerosil R-972), and the mixture was supplied to a one-component developing system electrophotographic copying device (NP-400 RE, produced by Canon) for copying test, whereby sufficient image density and developing durability could be obtained. For the purpose of detailed study about the heat fixing characteristic, only the fixing portion of said copying device was prepared, and unfixed image on a transfer paper separately prepared was fixed on this separate fixer. As the result, fixing characteristic was excellent without generation of the off-set phenomenon over a wide temperature range. Further, when the capsule toner was left to stand in an atmosphere at 50° C., there was observed no blocking or caking.

EXAMPLE 10

Example 9 was repeated except that the polyester of Example 9 was replaced with another example (Preparation example 6) and the amine employed was replaced with polyoxyethylene dodecylamine to obtain a capsule toner. Its properties are shown in Table 2.

EXAMPLE 11

Example 9 was repeated except that 100 parts of the polyester of Preparation example 10 was employed as the polyester and one part of polyoxyethylene dodecylamine as the amine to obtain a capsule toner. Its properties are shown in Table 2.

COMPARATIVE EXAMPLE 4

Example 9 was repeated except that the polyester of Preparation example 7 was employed as the polyester and polyoxyethylene dodecylamine as the amine to obtain a capsule toner. This toner had a high fixing point as shown in Table 2 result in bad fixing.

COMPARATIVE EXAMPLE 5

A mixture comprising 100 parts of the polyester of Preparation example 6, 0.5 part of polyoxyethylene dodecylamine, 70 parts of magnetic powders (Magnetite EPT-1000, produced by Toda Kogyo), and 5 parts of a low molecular weight polyethylene was heated and kneaded on a roll. The kneaded product was cooled, pulverized by means of a speed mill and jet mill, followed by classification by means of a wind force classifying machine, to obtain a magnetic toner with an average size of around 12μ.

To the magnetic toner was added a colloidal silica (Aerosil R-972), and the mixture was supplied to a one-component developing system electrophotographic copying device (modified NP-400 RE, produced by Canon) for copying test, whereby satisfactory image could be obtained. The result of the test of a hot roll fixing test machine separately prepared indicated that the fixing characteristic was also excellent without generation of the off-set phenomenon over a wide temperature range. However, when this toner was left to stand in an atmosphere of 45° C., blocking occurred easily.

COMPARATIVE EXAMPLE 6

By use of a mixture comprising 100 parts of the polyester of Preparation example 6, 70 parts of magnetic powders (Magnetite EPT-1000, produced by Toda Kogyo), and 5 parts of a low molecular weight polyethylene, a magnetic toner was obtained in the same manner as in Comparative example 5. To the magnetic toner was added a colloidal silica, and the mixture was supplied to a one-component system development, whereby the developing characteristic was sufficient. However, in the process of hot roll fixing, off-set occurred so vigorously that there was no temperature range where both fixing and non-offset are possible. Also, this toner gave rise to blocking easily in the 45° C. storage test.

EXAMPLE 12

Example 9 was repeated except that the polyester of Preparation example 5 was used and hexadecyl dimethylamine was used as the amine to obtain a capsule toner. It properties are shown in Table 2.

COMPARATIVE EXAMPLE 7

Comparative example 5 was repeated except that the polyester of Preparation example 5 was used and hexadecyl dimethylamine was used as the amine to obtain a non-capsule toner comprising only the core material particles. This toner was found to be good in developing and fixing characteristics, but not practically useful with respect to blocking after standing.

EXAMPLE 13

A mixture comprising 100 parts of a polyester (Preparation example 6), 1 part of hardened tallow alkylpropylenediamine, 70 parts of magnetic powders (Magnetite EPT-1000, produced by Toda Kogyo), and 5 parts of a low molecular weight polypropylene (Biscol 660 P, produced by Sanyo Kasei Kogyo) was heated and kneaded on a roll. After the kneaded product was left to cool, it was coarsely pulverized into sizes of 1 to 2 mm, followed further by micropulverization by means of a jet mill and classification by means of a wind force classifying machine, to obtain core material particles with an average size of around 12μ.

Separately, there was also prepared a styrene-butyl methacrylate-ethyl acrylate-2-ethylhexyl acrylate-itaconic acid copolymer emulsion (itaconic acid 2 mol %, solid content 42%). The resin constituting this emulsion had a glass transition temperature of 65° C., a softening point of 135° C., Mw of 280,000 and Mw/Mn of 8.5.

An acrylic copolymer resin (Highloss X-316, produced by Seiko Kagaku, acid value 60) was dissolved in an ammoniacal alkali solution to provide a 25% aqueous solution.

Twenty (20) parts of the above emulsion were mixed with 8 parts of the above aqueous resin solution, and to the resulting mixture were added 50 parts of above core material and 200 parts of water, followed by thorough mixing and dispersing. Then, the resulting dispersion was spray dried by means of a spray drier under the conditions of an inlet temperature of 160° C. and an outlet temperature of 80° C. to provide a crosslinked resin coating layer constituted mainly the aforesaid emulsion copolymer and the alkali soluble type resin around the core material particles.

To the thus obtained capsule toner was added a colloidal silica (Aerosil R-972), and copying test was conducted similarly as in Example 9. The results are shown in Table 2.

EXAMPLE 14

A capsule toner was obtained in the same manner as in Example 13 except that the polyester of Preparation example 6 was used as the polyester and hexadecyl dimethylamine as the amine. The properties of the toner are shown in Table 2.

TABLE 2

|  |  | Image quality | Fixing temperature | Off-set | Blocking after standing at 45° C. |
|---|---|---|---|---|---|
| Example | 9 | Good | 135° C. | Good | None |
|  | 10 | " | 130 | " | " |
|  | 11 | " | 115 | " | " |
|  | 12 | " | 120 | " | " |
|  | 13 | " | 125 | " | " |
|  | 14 | " | 125 | " | " |
| Comparative example | 4 | Good | 145 | Slightly unfixed off-set | None |
|  | 5 | " | 120 | Good | Bad |
|  | 6 | " | 100 | Bad | " |
|  | 7 | " | 110 | Good | " |

EXAMPLE 15

A mixture comprising 100 parts of the polyester (Preparation example 9), 2 parts of basic aluminum acetate, 70 parts of magnetic powders (Magnetite EPT-1000, produced by Toda Kogyo), and 5 parts of a low molecular weight polypropylene (Biscol 660 P, produced by Sanyo Kasei Kogyo) was heated and kneaded on a roll. After the kneaded product was left to cool, it was coarsely pulverized into sizes of 1 to 2 mm, followed further by micropulverization by means of a jet mill and classification by means of a wind force classifying machine, to obtain core material particles with an average size of around 12$\mu$.

Separately, there was also prepared a styrene-butyl methacrylate-butyl acrylate-acrylic acid copolymer emulsion (acrylic acid 3 mol %, solid content 40%). The resin constituting this emulsion had a glass transition temperature of 70° C., a softening point of 140° C., Mw of 230,000, and Mw/Mn of 6.3.

To 20 parts of this emulsion were added 58 parts of the above core material, 0.4 part of a metal complex dye (Bontron E-81, produced by Orient Kagaku), and 240 parts of water, and the mixture was thoroughly mixed and dispersed while avoiding foaming. Then, the resulting dispersion was spray dried by means of a spray drier under the conditions of an inlet temperature of 160° C. and an outlet temperature of 90° C. to provide a cross-linked resin coating layer mainly constituted of the aforesaid emulsion copolymer around the core material particles. To the thus obtained capsule toner was added a colloidal silica (Aerosil R-972), and the mixture was supplied to a one-component developing system electrophotographic copying device (NP-400 RE, produced by Canon) for copying test, whereby sufficient image density and developing durability could be obtained.

For the purpose of detailed study about the heat fixing characteristic, only the fixing portion of said copying device was prepared, and unfixed image on a transfer paper separately prepared was fixed on this separate fixer. As the result, fixing characteristic was excellent without generation of the off-set phenomenon over a wide temperature range.

Further, when the capsule toner was left to stand in an atmosphere at 50° C., there was observed neither blocking nor caking.

EXAMPLE 16

Example 15 was repeated except that the polyester was replaced with the polyester of Preparation example 6 and the basic aluminum acetated with aluminum isopropoxide to obtain a capsule toner. This magnetic toner had the properties without any problem with respect to developing characteristic, fixing characteristic, off-set, and blocking similarly as in Example 15.

EXAMPLE 17

Example 15 was repeated except that the polyester was replaced with the polyester of Preparation example 10 and aluminum isopropoxide was used the polyvalent metal compound to obtain a magnetic capsule toner. This magnetic toner had the properties which were good in all of developing characteristic, fixing characteristic, off-set, and blocking similarly as in Example 15.

EXAMPLE 18

Example 15 was repeated except that the polyester was replaced with the polyester of Preparation example 5 and ion acetylacetonate was used as the polyvalent metal compound to obtain a magnetic capsule toner.

This magnetic toner had the properties which were good similarly as in respective Examples in all of developing characteristic, fixing characteristic, off-set, and blocking.

COMPARATIVE EXAMPLE 8

Example 15 was repeated except that the polyester of Preparation example 7 was employed as the polyester and aluminum isopropoxide as the polyvalent metal compound to obtain a capsule magnetic toner.

When this toner was subjected to the test similarly as in Example 15, it had a high fixing temperature, to result in unfixed off-set due to bad fixing.

EXAMPLE 19

A mixture comprising 100 parts of a polyester (Preparation example 9), 2 parts of basic aluminum acetate, 70 parts of magnetic powders (Magnetite BL-120, produced by Titan Kogyo), and 5 parts of a low molecular weight polypropylene (Biscol 660 P, produced by Sanyo Kasei Kogyo) was heated and kneaded on a roll. After the kneaded product was left to cool, it was coarsely pulverized into sizes of 1 to 2 mm, followed further by micro-pulverization by means of a jet mill and classification by means of a wind force classifying machine, to obtain core material particles with an average size of around 12$\mu$.

Separately, there was also prepared a styrenebutyl methacrylate-ethyl acrylate-2-ethylhexyl acrylate-itaconic acid copolymer emulsion (itaconic acid 2 mol %, solid content 42%). The resin constituting this emulsion had a glass transition temperature of 65° C., a softening point of 135° C., Mw of 280,000, and Mw/Mn of 8.5.

An acrylic copolymer resin (Highloss X-316, produced by Seiko Kagaku, acid value 60) was dissolved in ammoniacal alkali solution to provide a 25% aqueous solution.

Twenty (20) parts of the above emulsion were mixed with 8 parts of the above aqueous resin solution, and to the resulting mixture were added 50 parts of above core material and 200 parts of water, followed by thorough mixing and dispersing. Then, the resulting dispersion was spray dried by means of a spray drier under the conditions of an inlet temperature of 160° C. and an outlet temperature of 80° C. to provide a crosslinked resin coating layer constituted mainly of the aforesaid emulsion copolymer and the alkali soluble type resin around the core material particles.

To the thus obtained capsule toner was added a colloidal silica (Aerosil R-972), and copying test was conducted similarly as in Example 15. As the result, developing characteristic, fixing characteristic and off-set were all good, without the problem of blocking after 45° C. standing.

EXAMPLE 20

Example 15 was repeated except that the polyester was replaced with the polyester of Preparation example 10 and aluminum acetylacetonate was used as the polyvalent metal compound to obtain a capsule toner. As the result of the test conducted similarly as in Example 19 by use of this magnetic toner, all of developing characteristic, fixing characteristic, off-set were found to be good without the problem of blocking after standing at 45° C. for 24 hours.

COMPARATIVE EXAMPLE 9

Example 19 was repeated except that the polyester of Preparation example 8 was employed as the polyester to obtain a capsule magnetic toner.

When this toner was subjected to the test similarly as in Example 15, it had a high fixing temperature, to result in unfixed off-set due to bad fixing.

COMPARATIVE EXAMPLE 10

A mixture comprising 100 parts of the polyester of Preparation example 6, 2 parts of aluminum propoxide, 70 parts of magnetic powders (Magnetite EPT-1000, produced by Toda Kogyo), and 5 parts of a low molecular weight polyethylene was heated and kneaded on a roll. The kneaded product was cooled, pulverized by means of a speed mill and jet mill, followed by classification by means of a wind force classifying machine, to obtain a magnetic toner with an average size of around 12μ.

To the magnetic toner was added a colloidal silica (Aerosil R-972), and the mixture was supplied to a one-component developing system electrophotographic copying device (modified NP-400 RE, produced by Canon) for copying test, whereby a satisfactory image could be obtained. The result of the test of a hot roll fixing test machine separately prepared indicated that the fixing characteristic was also excellent without generation of the off-set phenomenon over a wide temperature range. However, when this toner was left to stand in an atmosphere of 45° C., blocking occurred easily.

EXAMPLE 21

A styrene-butyl acrylate crosslinked copolymer emulsion (styrene 65 mole %, butyl acrylate 35 mole %, crosslinked with divinylbenzene, gel content 30%, glass transition temperature 50° C.) was prepared. This emulsion was salted out, washed with water, and dried, followed by pulverization into coarse particles of 1 to 2 mm. After 100 parts of the above resin, 70 parts of magnetic powders (Magnetite EPT-1000, produced by Toda Kygyo), and 2 parts of a low molecular weight polyethylene (Hiwax 220 P, produced by Mitsui Sekiyu Kagaku) were premixed in a Henschell mixer, the mixture was melt and kneaded by heating on a roll mill. After the kneaded product was left to cool, it was coarsely crushed, followed further by micropulverization by means of a cutter mill, a jet mill and classification by means of a wind force classifying machine, to obtain core material particles with an average size of around 12μ. Separately, there was also prepared a styrene-butyl methacrylate-butyl acrylate-acrylic acid copolymer emulsion (acrylic acid 3 mol %, solid content 40%). The resin constituting this emulsion had a glass transition temperature of 70° C., a softening point of 140° C., Mw of 230,000, and Mw/Mn of 6.3.

To 20 parts of this emulsion were added 58 parts of the above core material, 0.4 part of a metal complex dye (Bontron E-81, produced by Orient Kagaku), and 240 parts of water, and the mixture was thoroughly mixed and dispersed while avoiding foaming. Then, the resulting dispersion was spray dried by means of a spray drier under the conditions of an inlet temperature of 160° C. and an outlet temperature of 90° C. to provide a crosslinked resin coating layer mainly constituted of the aforesaid emulsion constituting copolymer around the core material particles. To the thus obtained capsule toner was added a colloidal silica (Aerosil R-972), and the mixture was supplied to a one-component developing system electrophotographic copying device (NP-400 RE, produced by Canon) for copying test, whereby sufficient image density and developing durability could be obtained. For the purpose of detailed study about the heat fixing characteristic, only the fixing portion of said copying device was prepared, and unfixed image on a transfer paper separately prepared was fixed on this separate fixer. As the result, fixing characteristic was excellent without generation of the off-set phenomenon over a wide temperature range. Further, when the capsule toner was left to stand in an atmosphere at 50° C., there was observed no blocking or caking.

EXAMPLES 22, 23, COMPARATIVE EXAMPLES 11, 12

Example 21 was repeated except that the core material particle binder resin used in Example 21 was changed to other resins to obtain various capsule magnetic toners. Their contents and the properties of the toners obtained are shown in Table 3.

EXAMPLE 24

There was prepared a styrene-butyl acrylatebytyl methacrylate crosslinked copolymer emulsion (styrene 60 mole %, butyl acrylate 30 mole %, butyl methacrylate 10 mole %, crosslinked with divinylbenzene, gel content 44%, glass transition temperature 47° C.).

This emulsion was salted out, washed with water, and dried, followed by pulverization into coarse particles of 1 to 2 mm in size. A mixture of 100 parts of the above resin with 80 parts of magnetic powders (BL-120, produced by Titan Kogyo) and 5 parts of a low molecular weight polypropylene (Biscol 660 P, produced by Sanyo Kasei Kogyo) was melt and kneaded by heating on a roll mill. After cooling, the kneaded product was pulverized into coarse particles of 1 to 2 mm in size, followed by micro-pulverization by means of a jet mill and classification by means of a wind force classifying machine to obtain core material particles with an average size of around 12μ. Separately, there was also prepared a styrene-butyl methacrylate-ethyl acrylate-2- ethylhexyl acrylateitaconic acid copolymer emulsion (itaconic acid 2 mol %, solid content 42%). The resin constituting this emulsion had a glass transition temperature of 65° C., a softening point of 135° C., Mw of 280,000 and Mw/Mn of 8.5.

An acrylic copolymer resin (Highloss X-316, produced by Seiko Kagaku, acid value 60) was dissolved in an ammoniacal alkali solution to provide a 25% aqueous solution.

Twenty (20) parts of the above emulsion were mixed with 8 parts of the above aqueous resin solution, and to the resulting mixture were added 50 parts of above core material and 200 parts of water, followed by thorough mixing and dispersing. Then, the resulting dispersion was spray dried by means of a spray drier under the conditions of an inlet temperature of 160° C. and an output temperature of 80° C. to provide a crosslinked resin coating layer constituted mainly of the aforesaid emulsion copolymer and the alkali soluble type resin around the core material particles.

To the thus obtained capsule toner was added a colloidal silica (Aerosil R-972), and copying test was conducted similarly as in Example 21. The results are shown in Table 3.

COMPARATIVE EXAMPLE 13

Example 24 was repeated except that the core material particle binder resin used in Example 24 was changed to another resins to obtain a capsule magnetic toner. Its contents and the properties of the toner obtained are shown in Table 3.

COMPARATIVE EXAMPLE 14

A mixture of 100 parts of the resin from the same styrene-butyl acrylate crosslinked copolymer emulsion as used in Example 21 with 70 parts of magnetic powders (EPT-1000, produced by Toda Kogyo), 2 parts of a low molecular weight polyethylene (Hiwax 220 P), and a metal complex dye (Bontron E81, produced by Orient Kagaku Kogyo), was melt and kneaded by heating on a roll. The cooled kneaded product was coarsely pulverized, followed further by micro-pulverization by means of a jet mill and wind force classification to obtain toner particles of 5 to 25μ, with an average size of about 13μ. To this toner was added colloidal silica in an amount of 0.5%, and the resulting mixture was provided for use in the copying test conducted in the same manner as in Example 21. As the result, satisfactory image and fixing characteristic could be obtained. However, when the toner was left to stand in an atmosphere of 45° C. for 24 hours, blocking occurred completely to result in formation of a massive product.

TABLE 3

|  |  | Core material binder resin | Shell Material resin | Image quality | Fixing temperature | Off-set | Blocking |
|---|---|---|---|---|---|---|---|
| Example | 21 | St/BA = 65/35, gel 30% emulsion polymerization, Tg 50° C. | St/BMA/BA/AA emulsion Tg 70° C., softening point 140° C. | Good | 120° C. | Good | None |
|  | 22 | St/BA = 70/30, gel 45% emulsion polymerization, Tg 52° C. | St/BMA/BA/AA emulsion Tg 70° C., softening point 140° C. | Good | 130 | Good | None |
|  | 23 | St/BA/DM = 70/26/4 gel 50% emulsion polymerization, Tg 53° C. | St/BMA/BA/AA emulsion Tg 70° C., softening point 140° C. | Good | 130 | Good | None |
| Comparative example | 11 | St/BA = 80/20, gel 59% emulsion polymerization, Tg 63° C. | St/BMA/BA/AA emulsion Tg 70° C., softening point 140° C. | Good | 145 (slightly bad fixing) | Good | None |
| Comparative example | 12 | St/2EHA = 80/20, gel 10% emulsion polymerization, Tg 59° C. | St/BMA/BA/AA emulsion Tg 70° C., softening point 140° C. | Good | 130 | Bad | None |
| Example | 24 | St/BA/BMA = 60/30/10 emulsion polymerization, gel 44% Tg 47° C. | Styrene-acrylic emulsion/ styrene-acrylic alkali-soluble resin mixture | Good | 125 | Good | None |
| Comparative example | 13 | St/BMA = 70/30, gel 54% emulsion polymerization, | Styrene-acrylic emulsion/ styrene-acrylic alkali-soluble resin mixture | Good | 150 (Bad fixing) | Unfixed off-set generated | None |
|  | 14 | Same as in Example 21 | None | Good | 115 | Good | Bad |

What is claimed is:

1. A heat fixing developer of a capsule structure having the surface of a core particle, containing a binder resin having a crosslinked structure and a glass transition temperature of 60° C. or lower and a softening point of 50° to 130° C. and a colorant, coated with a vinyl type polymer having a glass transition temperature of 55° C. or higher, a softening point of 100° to 150° C., a Mw of 150,000 or more, and a Mw/Mn of 5 or more.

2. A heat fixing developer according to claim 1, wherein said binder resin comprises an amorphous polyester resin having a glass transition temperature of 60° C. or lower and a softening point of 60° to 130° C.

3. A heat fixing developer according to claim 1, wherein said binder resin comprises an amorphous polyester having a glass transition temperature of 60° C. or lower, a softening point of 50° to 110° C., and an acid value of 10 to 150, and an aliphatic amine or its derivative in a weight ratio of 1/500 to 1/5 relative to said polyester.

4. A heat fixing developer according to claim 1, wherein said binder resin comprises an amorphous polyester having a glass transition temperature of 60° C. or lower, a softening point of 50° to 110° C., and an acid value of 10 to 150, and a polyvalent metal compound in a weight ratio of 1/50 to ¼ relative to said polyester.

5. A heat fixing developer according to claim 1, wherein said binder resin comprises a vinyl type polymer having a glass transition temperature of 55° C. or lower, a softening point of 80° to 130° C., and a crosslinked structure with a gel content of 20% or more as the main component.

6. An electrostatic image developer comprising the surfaces of core particles of a heat fixing material mainly composed of a binder resin and a colorant coated with a thermoplastic resin, said binder resin comprising an amorphous polyester resin having a crosslinked structure and a glass transition temperature of 60° C. or lower and a softening point of 60° to 130° C., and said thermoplastic resin being a vinyl type polymer having a glass transition temperature of 55° C. or higher, a softening point of 100° to 150° C., a Mw of 150,000 or more, and a Mw/Mn of 5 or more.

7. An electrostatic image developer according to claim 6, wherein the polyester is contained in an amount of 50 wt. % or more in the binder resin.

8. An electrostatic image developer according to claim 6, wherein the polyester has a number-average molecular weight of 2000 to 20,000.

9. An electrostatic image developer comprising the surfaces of core particles of a heat fixing material mainly composed of a binder resin and a colorant coated with a thermoplastic resin, said binder resin comprising a resin prepared by additionally crosslinking a polyester resin having a crosslinked structure, a glass transition temperature of 60° C. or lower, a softening point of 50° to 110° C., and an acid value of 10 to 150, by use of an aliphatic amine or its derivative in a weight ratio of 1/500 to 1/5 relative to said polyester resin, and said thermoplastic resin being a vinyl type polymer having a glass transition temperature of 55° C. or higher, a softening point of 100° to 150° C., a Mw of 150,000 or more, and a Mw/Mn of 5 or more.

10. An electrostatic image developer according to claim 9, wherein the polyester is contained in an amount of 50 wt. % or more in the binder resin.

11. An electrostatic image developer according to claim 9, wherein the polyester has a number-average molecular weight of 2000 to 20,000.

12. An electrostatic image developer according to claim 9, wherein an aliphatic amine or its derivative is contained in a weight ratio of 1/500 to 1/10 relative to the polyester.

13. An electrostatic image developer comprising the surfaces of core particles of a heat fixing material mainly composed of a binder resin and a colorant coated with a thermoplastic resin, said binder resin comprising a resin prepared by additionally crosslinking a polyester resin having a crosslinked structure, a glass transition temperature of 60° C. or lower, a softening point of 50° to 110° C., and an acid value of 10 to 150, by use of a polyvalent metal compound in a weight ratio of 1/50 to ¼ relative to said polyester resin and said thermoplastic resin being a vinyl type polymer having a glass transition temperature of 55° C. or higher, a softening point of 100° to 150° C., a Mw of 150,000 or more, and a Mw/Mn of 5 or more.

14. An electrostatic image developer according to claim 13, the polyester is contained in an amount of 50 wt. % or more in the binder resin.

15. An electrostatic image developer according to claim 13, wherein the polyester has a number-average molecular weight of 2000 to 20,000.

16. An electrostatic image developer comprising the surfaces of core particles of a heat fixing material mainly composed of a binder resin and a colorant coated with a thermoplastic resin, said binder resin comprising a vinyl type polymer having a glass transition temperature of 55° C. or lower, a softening point of 80° to 130° C., and a crosslinked structure with a gel content of 20% or more as the main component, and said thermoplastic resin being a vinyl type polymer having a glass transition temperature of 55° C. or higher, a softening point of 100° to 150° C., and a weight-average molecular weight of 150,000 or more.

17. An electrostatic image developer according to claim 16, wherein the vinyl type polymer having a crosslinked structure is contained in an amount of 50 wt. % or more in the binder resin.

18. An electrostatic image developer according to claim 16, wherein the vinyl type polymer having a crosslinked structure has a gel content of 30% or more.

* * * * *

UNITED STATES PATENT AND TRADEMARK OFFICE
CERTIFICATE OF CORRECTION

PATENT NO. : 4,533,617

DATED : August 6, 1985

INVENTOR(S) : Sukejiro Inoue, et al.

It is certified that error appears in the above-identified patent and that said Letters Patent is hereby corrected as shown below:

| | | | |
|---|---|---|---|
| Column 1, | line 42, | "meled by" should be --melted by--. |
| Column 3, | line 15, | "sufer so" should be --suffer so--. |
| Column 6, | line 29, | "readily caused" should be --readily cause--. |
| Column 6, | line 51, | "weightfor" should be --weight for--. |
| Column 7, | line 15, | "50° C.(" should be --50° C.,--. |
| Column 8, | line 38, | "filter of," should be --filter,--. |
| Column 9, | line 26-7, | "glass temperatures of 55° C." should be --glass transition temperatures of 55° C.-- |
| Column 9, | line 32, | "will liable" should be --will be liable--. |
| Column 9, | line 50, | "solica," should be --silica,-- |
| Column 10, | line 64, | "by heating at 50° C." should be --by heating to 50° C.-- |
| Column 11, | line 41, | "terephtalic" should be --terephthalic--. |
| Column 13, | line 26, | "produce" should be --product--. |
| Column 15, | line 44, | "result in" should be --resulting--. |
| Column 16, | line 10, | "one-component system development" should be --one-component developing system--. |
| Column 16, | line 22, | "It properties" should be --Its properties--. |
| Column 16, | line 64, | after "mainly" insert --of--. |
| Column 18, | line 10, | "acetated" should be --acetate--. |
| Column 18, | line 19, | "used the polyvalent" should be --used as the polyvalent--. |
| Column 18, | line 57, | "styrenebutyl" should be --styrene-butyl--. |
| Column 20, | line 3, | "was melt" should be --was melted--. |

UNITED STATES PATENT AND TRADEMARK OFFICE
CERTIFICATE OF CORRECTION

PATENT NO. : 4,533,617

DATED : August 6, 1985

INVENTOR(S) : Sukejiro Inoue, et al.

It is certified that error appears in the above-identified patent and that said Letters Patent is hereby corrected as shown below:

Column 20, line 50, "acrylatebytyl" should be -acrylate-butyl--.
Column 20, line 61, "was melt" should be --was melted--.
Column 21, line 1, "acrylateitaconic" should be --acrylate itaconic--.
Column 22, line 4, "was melt" should be --was melted--.
Column 24, line 26, "13, the" should be --13, wherein the--.

Signed and Sealed this

Sixteenth Day of December, 1986

Attest:

DONALD J. QUIGG

Attesting Officer

Commissioner of Patents and Trademarks